(12) United States Patent
Ohtsuka et al.

(10) Patent No.: US 9,469,079 B2
(45) Date of Patent: Oct. 18, 2016

(54) FILM INSERT MOLDED PRODUCT

(75) Inventors: Haruhito Ohtsuka, Makinohara (JP); Masanobu Hayashi, Fujieda (JP)

(73) Assignees: YAZAKI CORPORATION, Tokyo (JP); SANWA SCREEN CO., LTD., Aichi (JP)

(*) Notice: Subject to any disclaimer, the term of this patent is extended or adjusted under 35 U.S.C. 154(b) by 0 days.

(21) Appl. No.: 13/806,917

(22) PCT Filed: Aug. 30, 2011

(86) PCT No.: PCT/JP2011/070094
§ 371 (c)(1),
(2), (4) Date: Dec. 26, 2012

(87) PCT Pub. No.: WO2012/029972
PCT Pub. Date: Mar. 8, 2012

(65) Prior Publication Data
US 2013/0108838 A1 May 2, 2013

(30) Foreign Application Priority Data
Aug. 30, 2010 (JP) .................. 2010-192423

(51) Int. Cl.
*B32B 3/02* (2006.01)
*B29C 45/14* (2006.01)
(Continued)

(52) U.S. Cl.
CPC ........... *B32B 3/02* (2013.01); *B29C 45/14467* (2013.01); *B60Q 3/0203* (2013.01); *B29C 2045/14532* (2013.01); *B29C 2045/14901* (2013.01); *B29K 2995/0025* (2013.01); *B29K 2995/0026* (2013.01); *B29L 2031/3005* (2013.01); *Y10T 428/24752* (2015.01)

(58) Field of Classification Search
None
See application file for complete search history.

(56) References Cited

U.S. PATENT DOCUMENTS 4,964,935 A * 10/1990 Biggs et al. .................. 428/113
5,558,931 A * 9/1996 Biggs et al. .................. 428/218
5,599,608 A * 2/1997 Yamamoto et al. .......... 428/192
(Continued)

FOREIGN PATENT DOCUMENTS

CN           1375846 A       10/2002
DE       199 11 718 A1        9/1999
(Continued)

OTHER PUBLICATIONS

International Search Report (PCT/ISA/210) dated Nov. 30, 2011, issued by the International Searching Authority in International Application No. PCT/JP2011/070094.
(Continued)

*Primary Examiner* — David Sample
*Assistant Examiner* — Donald M Flores, Jr.
(74) *Attorney, Agent, or Firm* — Sughrue Mion, PLLC

(57) ABSTRACT

A cover member of an illuminating unit is formed of a film insert molded product, in which a film is disposed on a decorative face. The film is arranged so an end part of the film is positioned in front of an end part of the decorative face, whereby a film end protecting area formed of an exposed part of a molded resin layer is provided between the end part of the decorative face and the end part of the film, and a surface of the film end protecting area is made flush with the surface of the film. A corner between the end part of the decorative face and an end face of the molded resin layer is set to be an acute angle, and the end face of the molded resin layer functions as a contact face with respect to a ceiling trim.

3 Claims, 5 Drawing Sheets

(51) Int. Cl.
*B60Q 3/02* (2006.01)
*B29L 31/30* (2006.01)

(56) References Cited

U.S. PATENT DOCUMENTS

| | | | |
|---|---|---|---|
| 5,658,652 A * | 8/1997 | Sellergren | 428/71 |
| 5,746,962 A * | 5/1998 | Yamamoto | 264/266 |
| 5,747,756 A | 5/1998 | Boedecker | |
| 6,168,742 B1 * | 1/2001 | Yamamoto | 264/266 |
| 2002/0114930 A1 | 8/2002 | Okamura et al. | |
| 2005/0123738 A1 * | 6/2005 | De Winter et al. | 428/304.4 |
| 2005/0145471 A1 | 7/2005 | Okamura et al. | |
| 2006/0222826 A1 | 10/2006 | Hamano et al. | |
| 2008/0277823 A1 | 11/2008 | Hayashi et al. | |
| 2011/0002138 A1 * | 1/2011 | Hayes et al. | 362/551 |
| 2011/0039049 A1 * | 2/2011 | Chow | 428/71 |
| 2012/0048458 A1 | 3/2012 | Goto et al. | |

FOREIGN PATENT DOCUMENTS

| | | |
|---|---|---|
| DE | 10 2007 004 800 A1 | 8/2008 |
| DE | 202007007498 U1 | 8/2008 |
| EP | 0 936 132 A3 | 8/1999 |
| EP | 1 647 385 A1 | 4/2006 |
| EP | 2 106 895 A1 | 10/2009 |
| EP | 2 269 797 A1 | 1/2011 |
| FR | 2 920 717 A1 | 3/2009 |
| JP | 4-147817 A | 5/1992 |
| JP | 07-88887 A | 4/1995 |
| JP | 2008-23830 A | 2/2008 |
| JP | 4054040 B2 | 2/2008 |
| JP | 2008-168613 A | 7/2008 |
| JP | 2012-051115 A | 3/2012 |
| KR | 10-2006-0063795 A | 6/2006 |
| WO | 98/11576 A1 | 3/1998 |

OTHER PUBLICATIONS

Written Opinion (PCT/ISA/237) dated Nov. 30, 2011, issued by the International Searching Authority, in International Application No. PCT/JP2011/070094.
Communication dated Jul. 11, 2014 issued by the Korean Intellectual Property Office in counterpart Korean Patent Application No. 10-2013-7005304.
Office Action dated Jul. 8, 2014 issued by the Japanese Patent Office in counterpart Japanese Patent Application No. 2010-192423.
Office Action, dated Jul. 18, 2014, issued by The State Intellectual Property Office of the People's Republic of China in counterpart Patent Application No. 201180042069.5.
Notice of Allowance dated Jan. 7, 2015, issued by the Korean Intellectual Property Office in counterpart Korean Application No. 10-2013-7005304.
Communication dated Mar. 20, 2015 issued by the State Intellectual Property Office of the People's Republic of China in counterpart Chinese Patent Application No. 201180042069.5.
Third Office Action issued on Aug. 31, 2015 by The State Intellectual Property Office in related Application No. 201180042069.5.
Wang, "Training Course of Auto Beauty and Decoration Techniques", A Collection of Training Courses on Automobile Servicing Techniques, National Defense Industry Press, Jan. 31, 2006, 8 total pages.
Communication issued Apr. 26, 2016, issued by the German Patent and Trade Mark Office in counterpart German Patent Application No. 112011102872.5.

* cited by examiner

FILM INSERT MOLDED PRODUCT

TECHNICAL FIELD

The present invention relates to a film insert molded product which is useful, for example, as a cover member equipped with a lens in a ceiling illuminating apparatus for a vehicle which is provided in a vehicle room with its decorative face directed to the vehicle room.

BACKGROUND ART

As one of arts for decorating a resin molded product, a method called as film insert molding has been conventionally known. The film insert molding is such a method that a film for constituting a decorative face which has been foamed in advance is set on a cavity face of a mold, and then, molten resin is injected into the die to be hardened, thereby to obtain a molded product in which a film and molded resin are integrated. The molded products produced according to this method are widely used, for example, as interior equipments of automobiles.

FIG. 4 is an exploded perspective view of a ceiling illuminating apparatus provided on a ceiling region in a vehicle room of an automobile, which is an example of the film insert molded product, as seen from below.

In FIG. 4, represented by numeral 20 is a ceiling trim. A ceiling illuminating apparatus composed of a lamp unit 30 and a cover member 110 equipped with lenses is attached to an opening 21 of the ceiling trim 20. The lamp unit 30 is provided with switches 36 and lamps 37, and the cover member 110 equipped with lenses is provided with openings 116 for operation at positions corresponding to the switches 36, and lenses 117 at positions corresponding to the lamps 37. In this example, the cover member 110 equipped with lenses is formed of a film insert molded product, and its face opposed to the vehicle room functions as a decorative face 110A.

This ceiling illuminating apparatus is attached to the ceiling trim 20, in a state where a peripheral edge part of the opening 21 of the ceiling trim 20 is clamped between the cover member 110 and the lamp unit 30.

FIG. 5 is an enlarged sectional view showing relation between a peripheral edge part of the conventional cover member 110 and the peripheral edge part of the opening 21 of the ceiling trim 20.

The cover member 110 is formed of the film insert molded product in which a film 111 is disposed on a surface of a molded resin layer 112, and a surface of the film 111 constitutes the decorative face 110A of the cover member 110.

In this cover member 110 in the conventional case as shown in FIG. 5, an end part 111E of the film 111 is extended up to a position of an end part 112E of the molded resin layer 112. For this reason, there is such a problem that the end part 111E of the film 111 is likely to be peeled off.

As a countermeasure, usually, as shown in FIG. 6, an outer peripheral bent part 111F is formed continuously from the end part 111E of the film 111 so as to cover even an end face 112D of the molded resin layer 112 thereby to prevent the end part of the film 111 from being peeled off.

Reference is made to Japanese Patent Publication No. JP-A-2008-168613.

SUMMARY OF THE INVENTION

Technical Problem

However, in case where the outer peripheral bent part 111F is additionally formed continuously from the end part 111E of the film 111, as described above, a thickness of the end part of the cover member 110 must be as large as the outer peripheral bent part 111F can be provided. Therefore, when the peripheral edge part of the cover member 110 is pressed against the ceiling trim 20, there occurs such a problem that a step difference H is likely to be formed between the decorative face 110A of the cover member 110 and the ceiling trim 20.

The invention has been made in view of the above described circumstances, and an object of the invention is to provide a film insert molded product in which peeling of an end part of a film can be prevented, without forming a step difference such as an outer peripheral bent part.

Solution to Problem

In order to attain the above described object, the film insert molded product according to the invention has the following characteristics (1) to (3).

(1) In a film insert molded product which is molded by injecting molten resin into a mold, after a film has been set on a cavity face of the mold, and then, hardening the resin, wherein a back face of the film and a surface of a molded resin layer are adhered to integrate each other, and the film is disposed on a decorative face of the molded product, the film is so arranged that an end part of the film is positioned in front of an end part of the decorative face, whereby a film end protecting area formed of an exposed part of the molded resin layer is provided between the end part of the decorative face and the end part of the film, and a surface of the film end protecting area and the surface of the film are formed in flush with each other.

(2) In the film insert molded product having the structure as described above in (1), a corner between the end part of the decorative face and an end face of the molded resin layer is set to be an acute angle, and the end face of the molded resin layer functions as a contact face with respect to another member.

(3) In the film insert molded product having the structure as described above in (2), the film insert molded product is a cover member which is provided at an illuminating face side of an illuminating unit, wherein the molded resin layer is formed of transparent resin, the film is formed of a black colored film, and a range from a back face of the molded resin layer to an end face of the molded resin layer is covered with a film layer having a substantially same color as the black colored film.

According to the film insert molded product having the structure as described above in (1), the film end protecting area formed of the exposed part of the molded resin layer is provided outside the end part of the film, and the surface of the film end protecting area and the surface of the film are formed in flush with each other. Therefore, it is possible to prevent peeling of the end part of the film. Moreover, because the outer peripheral bent part need not be provided in the end part of the film, a thickness of the end part of the molded resin layer can be made as small as possible. Therefore, when the end part of the molded resin layer is pressed against the other member, the step difference between the decorative face and the surface of the other member can be reduced to a negligible extent.

According to the film insert molded product having the structure as described above in (2), the corner between the end part of the decorative face and the end face of the molded resin layer is set to be an acute angle. Therefore, when the end face of the molded resin layer is pressed against the other member, a change from the decorative face to the surface of the other member can be a gentle change at an obtuse angle without a step difference. As the results, a boundary between the decorative face of the molded product and the surface of the other member can be made indistinctive, and a feeling of flushness can be obtained.

According to the film insert molded product having the structure as described above in (3), the molded resin layer is formed of transparent resin, the film is formed of the black colored film, and the range of the molded resin layer from the back face to the end face is covered with the film layer having the substantially same color as the black colored film. As the results, even though a particular work is not applied to the decorative face, the part of the molded resin layer which is exposed as the film end protecting area can be made indistinctive to the utmost, when it is seen from the front face side.

Advantageous Effects of the Invention

According to the invention, it is possible to prevent peeling of the end part of the film. Moreover, because the outer peripheral bent part need not be provided in the end part of the film, the thickness of the end part of the molded resin layer can be made as small as possible. As the results, when the end part of the molded resin layer is pressed against the other member, the step difference between the decorative face and the surface of the other member can be reduced to a negligible extent.

The invention has been briefly described herein above. Details of the invention will be further made clear, by reading through Description of Embodiments which will be described below, referring to the attached drawings.

DESCRIPTION OF EMBODIMENTS

Figure 1A:
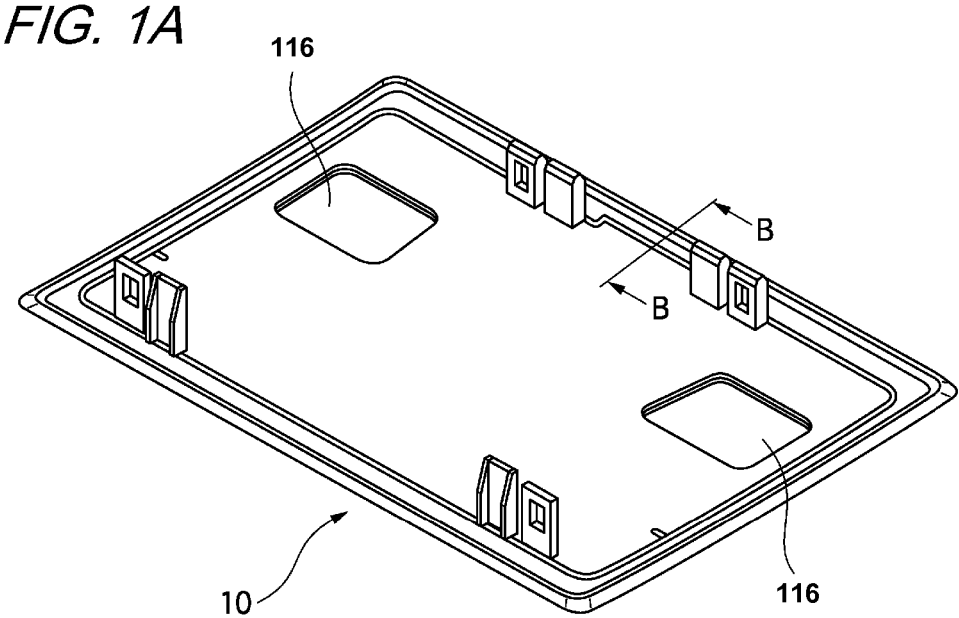
FIG. 1A is a perspective view of a cover member in a ceiling illuminating apparatus for a vehicle which is shown as a film insert molded product in an embodiment according to the invention, as seen from a back face side.

Now, an embodiment of the invention will be described referring to the drawings.

Figure 1B:
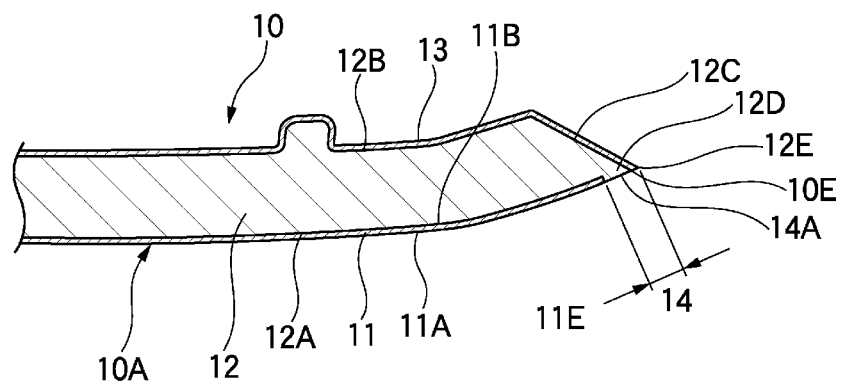
FIG. 1B is a sectional view of the cover member taken along a line B-B in FIG. 1A.
Figure 2:
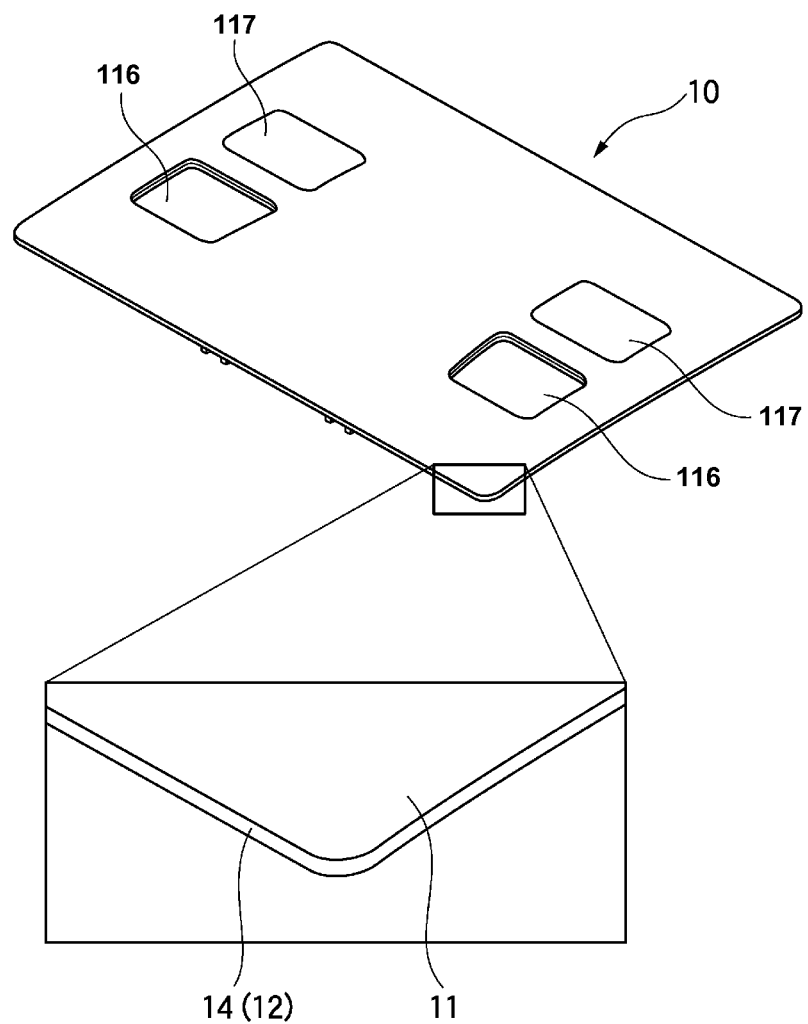
FIG. 2 is a perspective view of the cover member as seen from a front face side, and an enlarged view of a part of the cover member.
Figure 3:
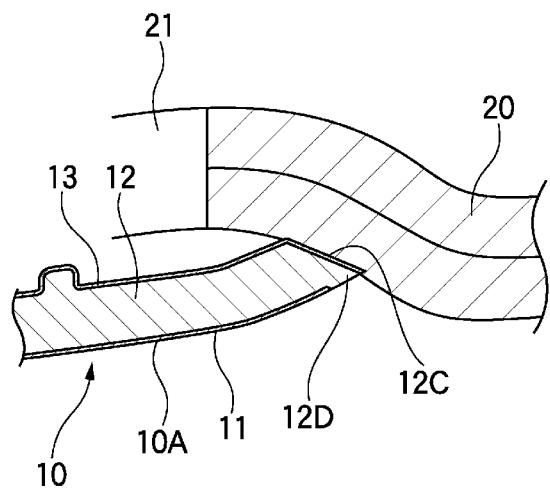
FIG. 3 is an enlarged sectional view of an end part of the cover member in a state pressed against a ceiling trim.

FIG. 1A is a perspective view of a cover member in a ceiling illuminating apparatus for a vehicle which is shown as a film insert molded product in the embodiment, as seen from a back face side, FIG. 1B is a sectional view of the cover member taken along a line B-B in FIG. 1A, FIG. 2 is a perspective view of the cover member as seen from a front face side, and an enlarged view of a part of the cover member, and FIG. 3 is an enlarged sectional view of an end part of the cover member in a state pressed against a ceiling trim.

Figure 4:
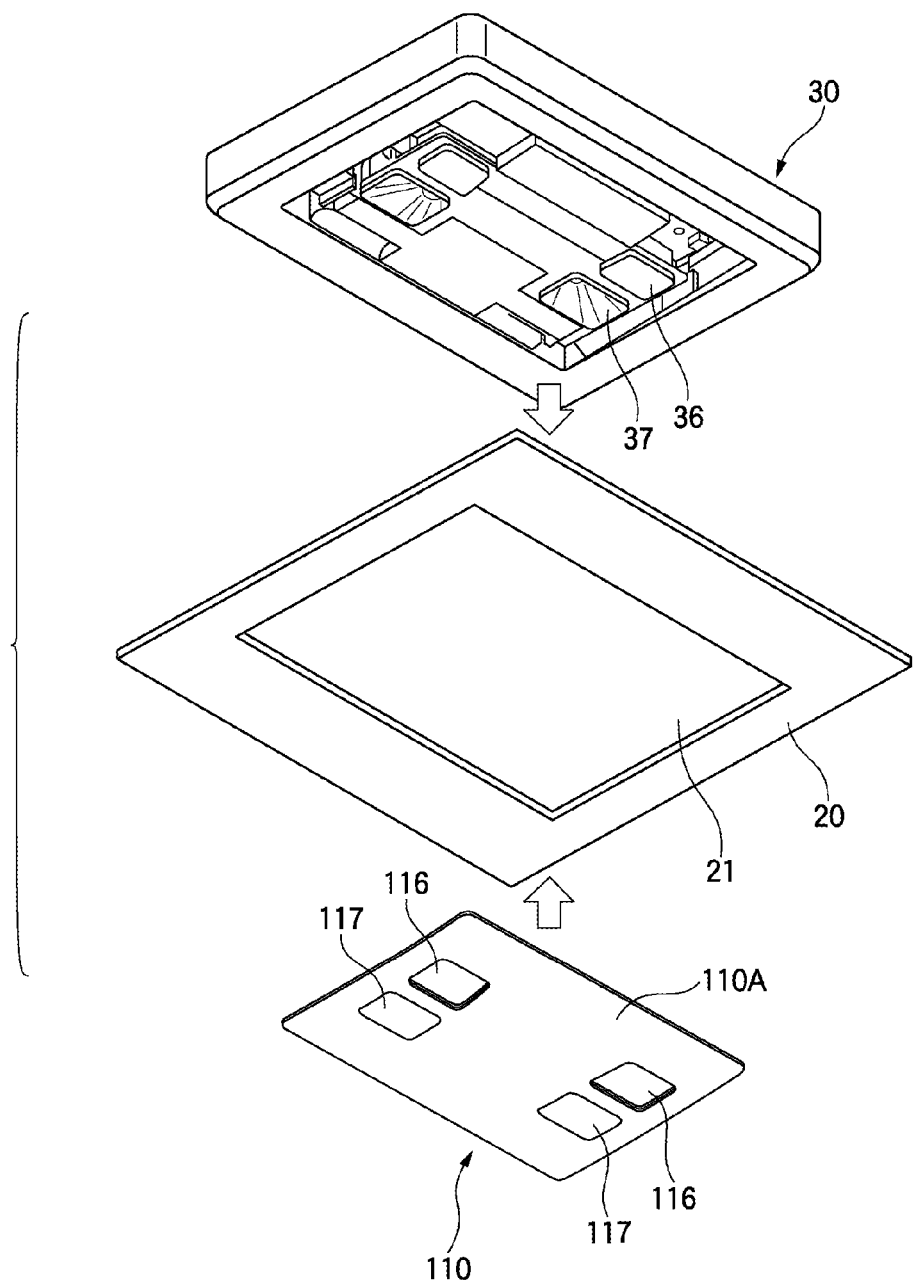
FIG. 4 is an exploded perspective view showing a schematic structure of a conventional ceiling illuminating apparatus for a vehicle.
Figure 5:
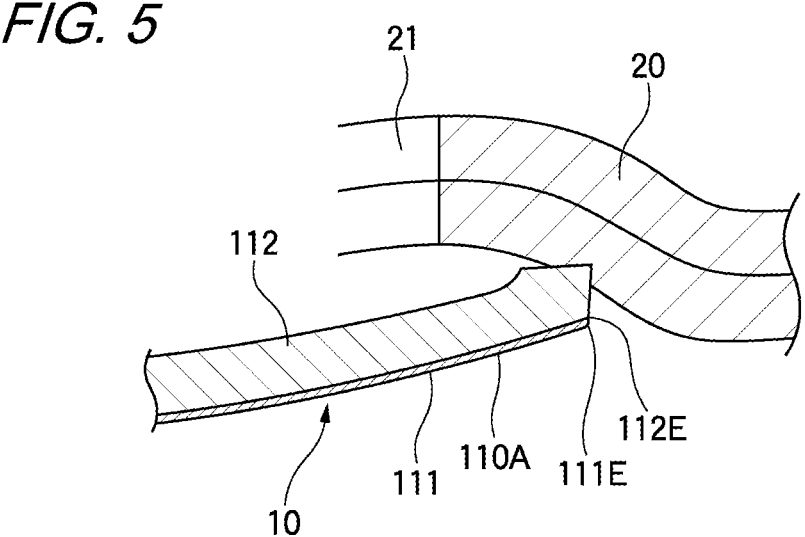
FIG. 5 is an enlarged view of an end part of a cover member in the conventional ceiling illuminating apparatus for a vehicle in a state pressed against a ceiling trim.

A cover member 10 as shown in FIG. 1A is combined with a lamp unit 30 as shown in FIG. 4 thereby to constitute a ceiling illuminating apparatus for a vehicle (an illuminating unit) which is attached to a ceiling trim 20. The cover member 10 is arranged at an illuminating face side in a vehicle room. By connecting this cover member 10 to the lamp unit 30 interposing the ceiling trim 20, a peripheral edge part of the cover member 10 is pressed against a face of a peripheral edge part of an opening 21 in the ceiling trim 20 at a vehicle room side.

This cover member 10 is formed of a film insert molded product. Specifically, as shown in FIG. 1B, the cover member 10 is molded by injecting molten resin into a mold, after a film 11 has been set on a cavity face of the mold, and then, hardening the molten resin. A back face 11B of the film 11 is adhered to a surface 12A of a molded resin layer 12 to be integrated with each other, so that the film 11 is disposed on a decorative face 10A of the molded product.

In this case, the film 11 which is arranged on the decorative face 10A is a shading film in a black color formed of PET, and the molded resin layer 12 is formed of transparent resin. In addition, a shading film layer 13 painted in a black color is provided on a back face 12B of the molded resin layer 12.

Moreover, as shown in FIG. 1B and FIG. 2, an end part 11E of the film 11 is positioned in front of an end part 10E of the decorative face 10A, and thus, a film end protecting area 14 formed of an exposed part of the molded resin layer 12 is provided between the end part 10E of the decorative face 10A and the end part 11E of the film 11. Further, a surface 14A of the film end protecting area 14 and the surface 11A of the film 11 are formed in flush with each other.

Further, a corner 12D between the end part 10E of the decorative face 10A and an end face 12C of the molded resin layer 12 is set to be an acute angle. The end face 12C of the molded resin layer 12 functions as a contact face with respect to the ceiling trim 20 (the other member). In addition, a range from the back face 12B to the end face 12C of the molded resin layer 12 is covered with the shading film layer 13 which is painted in a substantially same color as the black colored film 11.

Figure 6:
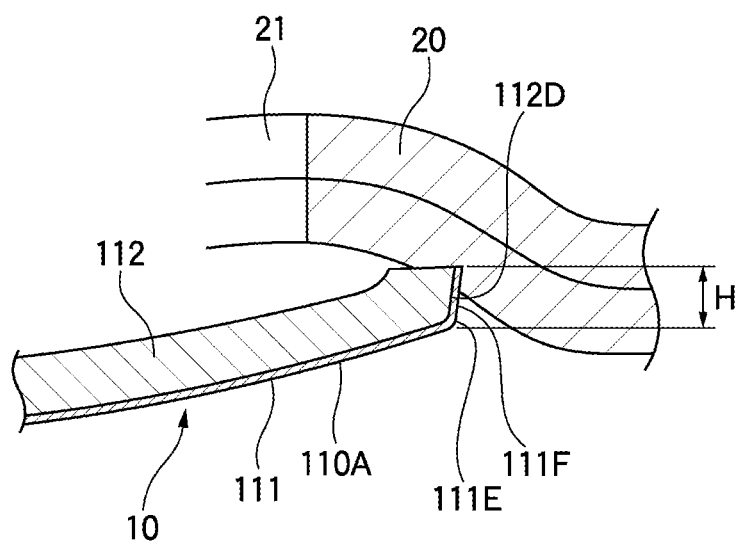
FIG. 6 is an enlarged view of an end part of another cover member in the conventional ceiling illuminating apparatus for a vehicle in a state pressed against the ceiling trim.

According to the cover member 10 (the film insert molded product) having the above described structure, it is possible to prevent peeling of the end part 11E of the film 11, because the film end protecting area 14 formed of the exposed part of the molded resin layer 12 is provided outside the end part 11E of the film 11, and the surface 14A of the film end protecting area 14 and the surface 11A of the film 11 are formed in flush with each other. Moreover, it is possible to make a thickness of the end part of the molded resin layer 12 as small as possible, because such an outer peripheral bent part provided in the conventional case as shown in FIG. 6 need not be provided. Therefore, when an end part 12E of the molded resin layer 12 is pressed against the ceiling trim 20, as shown in FIG. 3, the step difference between the decorative face 10A and the surface of the ceiling trim 20 can be reduced to a negligible extent.

Particularly, because the corner 12D between the end part 10E of the decorative face 10A and the end face 12C of the molded resin layer 12 is set to be an acute angle, when the end face 12C of the molded resin layer 12 is pressed against the ceiling trim 20, a change from the decorative face 10A to the surface of the ceiling trim 20 can be a gentle change at an obtuse angle without a step difference. Therefore, a boundary between the surface of the cover member 10 and the surface of the ceiling trim 20 can be made indistinctive, and a feeling of flushness can be obtained.

Moreover, the molded resin layer 12 is formed of the transparent resin, the film 11 is formed of the black colored film, and the range from the back face 12B to the end face 12C of the molded resin layer 12 is covered with the shading film layer 13 which is painted in the substantially same color as the black colored film 11. Therefore, even though a particular work is not applied to the decorative face 10A, the part of the molded resin layer 12 which is exposed as the film end protecting area 14 can be made indistinctive to the utmost, when it is seen from the front face side (a direction as shown in FIG. 2).

Moreover, the film 11 and the shading film layer 13 have such property that an illuminating light of a lamp cannot pass them through. Therefore, a part which the illuminating light passes through can be freely designed, according to a combination between a range where the shading film layer 13 is formed and a shape of the film 11.

The invention is not limited to the above described embodiment, but various modifications, improvements and so on can be appropriately made. Moreover, materials, shapes, sizes, numbers, positions to be arranged, etc. of components in the above described embodiment are not limited, but optional, provided that the invention can be attained. For example, in some cases, a region where the corner 12D between the end part 10E of the decorative face 10A and the end face 12C of the molded resin layer 12 is at an acute angle, and a region where the corner 12D is at an obtuse angle may be mixed in the cover member 10. In this case, it is possible to combine the respective arts, in such a manner that this invention is applied to the region where the corner 12D is at the acute angle, and the conventional art is applied to the region where the corner 12D is at the obtuse angle, by providing the outer peripheral bent part 111F which has been described referring to FIG. 6.

INDUSTRIAL APPLICABILITY

According to the invention, it is possible to prevent peeling of the end part of the film. Moreover, because the outer peripheral bent part need not be provided in the end part of the film, the thickness of the end part of the molded resin layer can be made as small as possible. As the results, when the end part of the molded resin layer is pressed against the other member, the step difference between the decorative face and the surface of the other member can be reduced to a negligible extent.

The present application is based on Japanese Patent Application No. 2010-192423 filed on Aug. 30, 2010, the entire contents of which are incorporated herein by reference.

REFERENCE SIGN LIST

10 Cover member (Film insert molded product)
10A Decorative face
10E End part of decorative face
11 Film
11A Surface
11B Back face
11E End part
12 Molded resin layer
12A Surface
12B Back face
12C End face
12D Corner
12E End part
13 Shading film layer
14 Film end protecting area
14A Surface
20 Ceiling trim (Another member)

The invention claimed is:

1. A film insert molded product which is molded by injecting molten resin into a mold, after a film has been set on a cavity face of the mold, and then, hardening the resin, wherein a back face of the film and a surface of a molded resin layer are adhered to integrate each other, and the film is disposed on a decorative face of the film insert molded product,
   wherein the film is so arranged that an end part of the film is positioned a distance from an end part of the decorative face to expose the decorative face on a side facing a same direction as a front face of the film, whereby a film end protecting area formed of an exposed part of the molded resin layer is provided between the end part of the decorative face and the end part of the film, and a surface of the film end protecting area and the front face of the film are formed in flush with each other;
   wherein a shading film layer is provided on a face of the film insert molded product opposite the film; and
   wherein the shading film layer extends to and covers an entire end face of the molded resin layer.

2. A film insert molded product as claimed in claim 1, wherein the film insert molded product is a cover member which is provided at an illuminating face side of an illuminating unit, wherein the molded resin layer is formed of transparent resin, and the film is formed of a black colored film, which is a film layer having an essentially same color as the black colored film.

3. A film insert molded product as claimed in claim 1, wherein a corner between the end part of the decorative face and the end face of the molded resin layer is set to be an acute angle, and the end face of the molded resin layer functions as a contact face with respect to a ceiling trim.

* * * * *